(12) United States Patent
Cheng et al.

(10) Patent No.: US 12,103,113 B2
(45) Date of Patent: Oct. 1, 2024

(54) COPPER-PHOSPHORUS BRAZING WIRE FOR BRAZING COPPER ALLOY SPECTACLE FRAME AS WELL AS PREPARING METHOD AND SYSTEM THEREOF

(71) Applicant: ZHENGZHOU RESEARCH INSTITUTE OF MECHANICAL ENGINEERING CO., LTD., Henan (CN)

(72) Inventors: Yafang Cheng, Henan (CN); Junlan Huang, Henan (CN); Xian Dong, Henan (CN); Yanhong Guo, Henan (CN); Yong Li, Henan (CN); Yinyin Pei, Henan (CN); Quanbin Lu, Henan (CN); Bowen Dong, Henan (CN); Hangyan Xue, Henan (CN)

(73) Assignee: ZHENGZHOU RESEARCH INSTITUTE OF MECHANICAL ENGINEERING CO., LTD., Henan (CN)

( * ) Notice: Subject to any disclaimer, the term of this patent is extended or adjusted under 35 U.S.C. 154(b) by 0 days.

(21) Appl. No.: 18/169,200

(22) Filed: Feb. 14, 2023

(65) Prior Publication Data
US 2023/0405732 A1 Dec. 21, 2023

(30) Foreign Application Priority Data

Jun. 20, 2022 (CN) .......................... 202210697782.3

(51) Int. Cl.
*B23K 35/02* (2006.01)
*B23K 35/30* (2006.01)
(Continued)

(52) U.S. Cl.
CPC ........ *B23K 35/0227* (2013.01); *B23K 35/302* (2013.01); *B23K 35/40* (2013.01);
(Continued)

(58) Field of Classification Search
CPC .. B23K 35/0227; B23K 35/302; B23K 35/40; B23K 2101/24; B23K 2103/12; C22C 9/00; C22F 1/08; Y02P 10/25
See application file for complete search history.

(56) References Cited

U.S. PATENT DOCUMENTS

| | | | | |
|---|---|---|---|---|
| 4,118,617 A | * | 10/1978 | Moreau | C21D 9/60 |
| | | | | 266/112 |
| 2005/0249629 A1 | * | 11/2005 | Harris | B23K 35/0233 |
| | | | | 420/472 |
| 2020/0023453 A1 | | 1/2020 | Hosomi et al. | |

FOREIGN PATENT DOCUMENTS

| | | |
|---|---|---|
| CN | 101786208 A | 7/2010 |
| CN | 103624418 A | 3/2014 |

(Continued)

OTHER PUBLICATIONS

RU2036064, machine translation. (Year: 1995).*
(Continued)

*Primary Examiner* — John A Hevey
(74) *Attorney, Agent, or Firm* — Tarolli, Sundheim, Covell & Tummino LLP

(57) ABSTRACT

The present disclosure relates to the field of brazing material technologies, and particularly to a copper-phosphorus brazing wire for brazing a copper alloy spectacle frame as well as a preparing method and system thereof. The copper-phosphorus brazing wire for brazing a copper alloy spectacle frame includes components with following mass percentage, 87.1%~91.4% of Cu, 1.5%~2.6% of Ag, 5.9%~8.4% of P, 0.2%~0.42% of Al and 0.8%~1.68% of Si. For the copper-phosphorus brazing wire according to the present disclosure,
(Continued)

through coordination and cooperation of the components, impurity content is low and joint strength is high in a welding process; a mass ratio of the Si to the Al is a constant value, and a dense oxide film may be formed on a surface of a molten pool to hinder volatilization of Zn in a base material.

8 Claims, 2 Drawing Sheets

(51) Int. Cl.
  *B23K 35/40* (2006.01)
  *C22C 9/00* (2006.01)
  *C22F 1/08* (2006.01)
  *B23K 101/24* (2006.01)
(52) U.S. Cl.
  CPC .................. *C22C 9/00* (2013.01); *C22F 1/08* (2013.01); *B23K 2101/24* (2018.08)

(56) References Cited

FOREIGN PATENT DOCUMENTS

| | | |
|---|---|---|
| CN | 104759781 A | 7/2015 |
| CN | 105149813 A | 12/2015 |
| CN | 111151917 A | 5/2020 |
| JP | 2004114158 A | 4/2004 |
| RU | 2036064 C1 * | 5/1995 |

OTHER PUBLICATIONS

Applicant: Zhengzhou Institute of Mechanics Co.; "Copper Phosphorous Wires for Copper Alloy Frame Brazing and Method for Producing, System for Producing Same"; Chinese Application No. 202210697782.3; Notification to Grant Patent Right For Invention; Jul. 24, 2023; 6 pgs.

* cited by examiner

COPPER-PHOSPHORUS BRAZING WIRE FOR BRAZING COPPER ALLOY SPECTACLE FRAME AS WELL AS PREPARING METHOD AND SYSTEM THEREOF

CROSS-REFERENCE TO RELATED APPLICATIONS

The present disclosure claims the priority of the Chinese patent application with the application number of 202210697782.3 and the title of "COPPER-PHOSPHORUS BRAZING WIRE FOR BRAZING COPPER ALLOY SPECTACLE FRAME AS WELL AS PREPARING METHOD AND SYSTEM THEREOF" filed with the Chinese Patent Office on Jun. 20, 2022, the contents of which are incorporated by reference herein in their entirety.

TECHNICAL FIELD

The present disclosure relates to the field of brazing material technologies, and particularly to a copper-phosphorus brazing wire for brazing a copper alloy spectacle frame as well as a preparing method and system thereof.

BACKGROUND ART

A commonly used welding method for copper alloy spectacle frames is induction brazing, and commonly used brazing filler metal is silver brazing filler metal (for example, flux-cored silver brazing filler metal disclosed in patent document CN111344105A). Since the silver brazing filler metal has a low brazing temperature and is easily processed into fine wires required for brazing the spectacle frames, the silver brazing wires are generally adopted to braze the copper alloy spectacle frames in many manufacturers. However, the existing silver brazing wire has high silver content and thus a high cost, and when a copper alloy is welded, a low-melting-point element Zn in a copper base material is prone to volatilization, such that defects, such as air holes, inclusions, or the like, are caused, resulting in reduction of mechanical properties of a joint.

Copper-phosphorus brazing filler metal has a low cost and a moderate brazing temperature, and may be used for brazing the copper alloy spectacle frames. However, the existing copper-phosphorus brazing filler metal has a large amount of brittle phase $Cu_3P$ and thus poor processability, and fine wires with a diameter below 0.5 mm required for brazing the spectacle frames are difficult to obtain.

In view of this, the present disclosure is particularly proposed.

SUMMARY

An object of the present disclosure is to provide a copper-phosphorus brazing wire for brazing a copper alloy spectacle frame, so as to solve a technical problem that existing copper-phosphorus brazing filler metal has a large amount of brittle phase $Cu_3P$ and thus poor processability, and fine wires with a diameter below 0.5 mm required for brazing the spectacle frame are difficult to obtain.

Another object of the present disclosure is to provide a preparing method of the copper-phosphorus brazing wire for brazing a copper alloy spectacle frame, in which electromagnetic induction heating is adopted and a difference of rotating speeds of two step pulleys is utilized to draw a first alloy wire to have a diameter below 0.5 mm.

Another object of the present disclosure is to provide a preparing system adopted in the preparing method of the copper-phosphorus brazing wire for brazing a copper alloy spectacle frame, which may efficiently complete preparation of the copper-phosphorus brazing wire through cooperation of all devices and has a high yield.

In order to achieve the above-mentioned objects of the present disclosure, the following technical solution is specifically adopted.

A copper-phosphorus brazing wire for brazing a copper alloy spectacle frame includes components with following mass percentage,
87.1%~91.4% of Cu, 1.5%~2.6% of Ag, 5.9%~8.4% of P, of Al and 0.8%~1.68% of Si.

In an embodiment, the copper-phosphorus brazing wire includes components with following mass percentage,
87.5%~89.4% of Cu, 2.1%~2.5% of Ag, 7.5%~8% of P, of Al and 0.8%~1.6% of Si;
preferably, the Si and the Al have a mass ratio of 4:1.

A preparing method of the copper-phosphorus brazing wire for brazing a copper alloy spectacle frame includes the following steps:
  according to mass percentages of components in the copper-phosphorus brazing wire for brazing a copper alloy spectacle frame, taking a mixture of raw materials corresponding to the components, and performing smelting, casting and extruding to obtain a first alloy wire; and
  sequentially winding the first alloy wire around a first step pulley for several circles and a second step pulley for several circles, continuously performing electromagnetic induction heating treatment on the first alloy wire between the first step pulley and the second step pulley, and rotating the first step pulley and the second step pulley in a same direction at different rotating speeds, such that the first alloy wire wound around the first step pulley is deformed and then transferred to be wound around the second step pulley, so as to obtain the copper-phosphorus brazing wire.

In an embodiment, a temperature of the electromagnetic induction heating treatment is 350~400° C.

In an embodiment, the first alloy wire on the first step pulley is connected with a first alloy wire supply source.

In an embodiment, the copper-phosphorus brazing wire is subjected to shaping treatment.

In an embodiment, the copper-phosphorus brazing wire after the shaping treatment is wound up.

In an embodiment, in the step of sequentially winding the first alloy wire around a first step pulley for several circles and a second step pulley for several circles, numbers of the circles of the first alloy wire wound around the first step pulley and the second step pulley are 2~3 respectively.

In an embodiment, a ratio of the rotating speeds of the first step pulley and the second step pulley is 1:(2~4) (i.e., 1:2 to 1:4).

In an embodiment, the first alloy wire has a diameter of 1.8~2.0 mm.

In an embodiment, the copper-phosphorus brazing wire has a diameter less than 0.5 mm.

A preparing system for implementing the preparing method of the copper-phosphorus brazing wire for brazing a copper alloy spectacle frame includes a first alloy wire preparing unit and a first alloy wire drawing unit;
  the first alloy wire drawing unit includes a box, and a first step pulley, a second step pulley and a heating coil are arranged inside the box;

a first central axis of the first step pulley is parallel to a second central axis of the second step pulley; the first step pulley and the second step pulley are connected by a first alloy wire wound around the first step pulley and the second step pulley; and the heating coil is sleeved over the first alloy wire between the first step pulley and the second step pulley.

In an embodiment, the first step pulley and the second step pulley are respectively arranged on a bottom surface of the box in a length direction of the box; the first central axis and the second central axis are respectively perpendicular to the bottom surface of the box.

In an embodiment, in the length direction of the box, a wire inlet is provided in a first side surface of the box, and a wire outlet is provided in a second side surface of the box; the wire inlet is close to the first step pulley, and the wire outlet is close to the second step pulley.

In an embodiment, the wire outlet is provided with a shaping device.

In an embodiment, the preparing system further includes a pay-off device and a take-up device; the pay-off device and the take-up device are respectively arranged outside the box.

In an embodiment, the first alloy wire between the first step pulley and the second step pulley is provided coaxially with the heating coil.

In an embodiment, a protective layer is provided outside the heating coil.

In an embodiment, the first step pulley is connected with a first motor, and the second step pulley is connected with a second motor.

Compared with a prior art, the present disclosure has the following beneficial effects.

(1) The copper-phosphorus brazing wire according to the present disclosure may achieve a welding effect of low impurity content and high joint strength in a welding process through coordination and cooperation of the components, wherein the mass ratio of the Si to the Al is a constant value, and a dense oxide film may be formed on a surface of a molten pool to hinder volatilization of Zn in a base material, thus reducing formation of defects, such as air holes, inclusions, or the like, in a brazing seam, and improving the joint strength.

(2) In the preparing method of the copper-phosphorus brazing wire according to the present disclosure, electromagnetic induction heating is adopted, a heat generation efficiency is higher, and the first alloy wire is heated to 350~400° C. quickly; the difference of the rotating speeds of the two step pulleys is controlled, such that the hot-state copper-phosphorus brazing wire is subjected to tension, undergoes constant-ratio creep deformation, and then is deformed to be thinned, so as to obtain the thin copper-phosphorus brazing wire. The method is simple and efficient.

(3) The preparing system adopted in the preparing method of the copper-phosphorus brazing wire for brazing a copper alloy spectacle frame according to the present disclosure may efficiently complete the preparation of the copper-phosphorus brazing wire through the cooperation of all the devices, and the yield is higher than 90%.

BRIEF DESCRIPTION OF DRAWINGS

To describe the technical solutions in the specific embodiments of the present disclosure or the prior art more clearly, the following briefly describes the accompanying drawings required for describing the specific embodiments or the prior art. Apparently, the accompanying drawings in the following description show some embodiments of the present disclosure, and a person of ordinary skill in the art may still derive other drawings from these accompanying drawings without creative efforts.

REFERENCE NUMERALS

Figure 1:
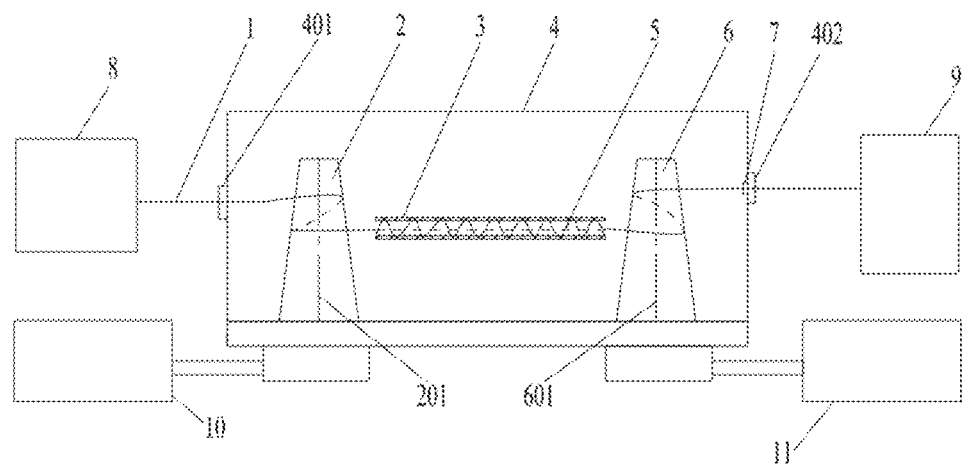
FIG. 1 is a schematic diagram of a first alloy wire drawing unit in the present disclosure.

1—first alloy wire, 2—first step pulley, 201—first central axis, 3—protective layer, 4—box, 401—wire inlet, 402—wire outlet, 5—heating coil, 6—second step pulley, 601—second central axis, 7—shaping device, 8—pay-off device, 9—take-up device, 10—first motor, 11—second motor.

DETAILED DESCRIPTION

The implementation of the present disclosure will be described in detail below in conjunction with embodiments, but those skilled in the art would understand that the following embodiments are merely for illustrating the present disclosure and should not be deemed as restriction of the present disclosure. The embodiments in which specific conditions are not given are performed according to conventional conditions or conditions suggested by manufacturers.

In descriptions of the present disclosure, it should be noted that, directions or positional relationships indicated by terms "center", "upper", "lower", "left", "right", "vertical", "horizontal", "inner", "outer", etc. are based on orientations or positional relationships shown in the accompanying drawings, or orientations or positional relationships of conventional placement of the product according to the present disclosure in use, and they are used only for describing the present disclosure and for description simplicity, but do not indicate or imply that an indicated device or element must be in a specific orientation or be constructed and operated in a specific orientation. Therefore, it cannot be understood as a limitation on the present disclosure. In addition, the terms such as "first", "second", "third", or the like, are only used for distinguishing descriptions and are not intended to indicate or imply relative importance.

In the description of the present disclosure, it still should be noted that unless specified or limited otherwise, the terms "provide", "mount", "connect", and "couple" and the like are used broadly, and may be, for example, fixed connections, detachable connections, or integral connections; may also be mechanical or electrical connections; may also be direct connections or indirect connections via intervening structures; may also be inner communications of two elements. The specific meaning of the above terms in the present disclosure can be understood by those skilled in the art according to specific situations.

According to an aspect of the present disclosure, the present disclosure relates to a copper-phosphorus brazing wire for brazing a copper alloy spectacle frame, including components with following mass percentage, 87.1%~91.4% of Cu, 1.5%~2.6% of Ag, 5.9%~8.4% of P, of Al and 0.8%~1.68% of Si.

The copper-phosphorus brazing wire according to the present disclosure may achieve a welding effect of low impurity content and high joint strength in a welding process through coordination and cooperation of the components. Preferably, the Si and the Al have a mass ratio of 4:1. The mass ratio of the Si to the Al is a constant value, and a dense oxide film may be formed on a surface of a molten pool to hinder volatilization of Zn in a base material, thus reducing formation of defects, such as air holes, inclusions, or the like, in a brazing seam, and improving the joint strength.

In an embodiment, the mass percentage of the Cu includes, but is not limited to, 87.1%, 87.5%, 87.7%, 88%, 88.2%, 88.5%, 88.7%, 89%, 89.5%, 89.7%, 91%, or 91.4%.

In an embodiment, the mass percentage of the Ag includes, but is not limited to, 1.5%, 1.6%, 1.7%, 1.8%, 1.9%, 2%, 2.2%, 2.5%, or 2.6%.

In an embodiment, the mass percentage of the P includes, but is not limited to, 5.9%, 6%, 6.2%, 6.5%, 6.7%, 7%, 7.2%, 7.5%, 7.8%, 8%, or 8.4%.

In an embodiment, the mass percentage of the Al includes, but is not limited to, 0.2%, 0.22%, 0.25%, 0.27%, 0.3%, 0.32%, 0.35%, 0.37%, or 0.42%.

In an embodiment, the mass percentage of the Si includes, but is not limited to, 0.8%, 0.82%, 0.85%, 0.88%, 0.9%, 0.94%, 1%, 1.1%, 1.2%, 1.3%, 1.4%, 1.5%, or 1.6%.

In an embodiment, the copper-phosphorus brazing wire for brazing a copper alloy spectacle frame includes components with following mass percentage, 87.5%~89.4% of Cu, 2.1%~2.5% of Ag, 7.5%~8% of P, 0.2%~0.4% of Al and 0.8%~1.6% of Si; the Si and the Al have a mass ratio of 4:1.

According to another aspect of the present disclosure, the present disclosure relates to a preparing method of the copper-phosphorus brazing wire for brazing a copper alloy spectacle frame, including the following steps:

according to mass percentages of components in the copper-phosphorus brazing wire for brazing a copper alloy spectacle frame, taking a mixture of raw materials corresponding to the components, and performing smelting, casting and extruding to obtain a first alloy wire; and sequentially winding the first alloy wire around a first step pulley for several circles and a second step pulley for several circles, continuously performing electromagnetic induction heating treatment on the first alloy wire between the first step pulley and the second step pulley, and rotating the first step pulley and the second step pulley in a same direction at different rotating speeds, such that the first alloy wire wound around the first step pulley is deformed and then transferred to be wound around the second step pulley, so as to obtain the copper-phosphorus brazing wire.

In the preparing method of the copper-phosphorus brazing wire according to the present disclosure, electromagnetic induction heating is adopted, a heat generation efficiency is higher, and the first alloy wire is heated to 350~400° C. quickly; a difference of rotating speeds of the two step pulleys is controlled, such that the hot-state copper-phosphorus brazing wire is subjected to tension, undergoes constant-ratio creep deformation, and then is deformed to be thinned, so as to obtain the thin copper-phosphorus brazing wire. The method is simple and efficient, and overcomes a technical bottleneck that copper-phosphorus fine wires with a diameter below 0.5 mm are difficult to efficiently prepare by a conventional method.

In an embodiment, a corresponding raw material of the P includes a Cu14P alloy. In an embodiment, a corresponding raw material of the Si includes a copper-silicon alloy, such as Cu10Si. In an embodiment, a corresponding raw material for the Ag element includes elementary silver. In an embodiment, a corresponding raw material for the Al includes elementary aluminum.

It should be noted that, for the copper-phosphorus brazing wire according to the present disclosure, the corresponding raw materials are selected according to the element proportion of final composition as long as a relationship between the components can be satisfied.

In an embodiment, a temperature of the electromagnetic induction heating treatment is 350~400° C. In an embodiment, the temperature of the electromagnetic induction heating treatment includes, but is not limited to, 355° C., 360° C., 365° C., 370° C., 375° C., 380° C., 385° C., 390° C., 395° C., 400° C., or the like. Heating of the first alloy wire at a proper temperature facilitates drawing of the first alloy wire, thereby increasing the yield.

In an embodiment, the first alloy wire on the first step pulley is connected with a first alloy wire supply source. The first alloy wire supply source provides a raw material of the first alloy wire for the first step pulley.

In an embodiment, the copper-phosphorus brazing wire is subjected to shaping treatment. The alloy wire meets an appearance requirement through the shaping treatment.

In an embodiment, the copper-phosphorus brazing wire after the shaping treatment is wound up. Winding up is performed by using a take-up device.

In an embodiment, in the step of sequentially winding the first alloy wire around a first step pulley for several circles and a second step pulley for several circles, numbers of the circles of the first alloy wire wound around the first step pulley and the second step pulley are 2~3 respectively. The alloy wire is fixed by proper circles, such that the first alloy wire is guaranteed to be subjected to a proper tension in the drawing process, so as to obtain an excellent drawing effect.

In an embodiment, a ratio of the rotating speeds of the first step pulley and the second step pulley is 1:(2~4). For example, the ratio may be 1:2, 1:3 or 1:4. The ratio of the rotating speeds of the first step pulley and the second step pulley is in a proper range, such that the hot-state first alloy wire may be subjected to tension, undergoes constant-ratio creep deformation, and then is deformed and thinned, so as to obtain the thin copper-phosphorus brazing wire. If the ratio of the rotating speeds of the first step pulley and the second step pulley is over small, the alloy wire may be broken due to over large tension in the drawing process; if the ratio of the rotating speeds of the first step pulley and the second step pulley is over large, the tension in the drawing process is insufficient, a deformation effect is insufficient, and thus a required diameter range cannot be achieved.

In an embodiment, the first alloy wire has a diameter of 1.8~2.0 mm. For example, the diameter may be 1.9 mm, 2 mm, 2.1 mm or 2.2 mm.

In an embodiment, the copper-phosphorus brazing wire has a diameter less than 0.5 mm. The first alloy wire may be drawn to have a diameter below 0.5 mm using the above-mentioned method, and the yield reaches 90%.

According to another aspect of the present disclosure, the present disclosure further relates to a preparing system adopted in the preparing method of the copper-phosphorus brazing wire for brazing a copper alloy spectacle frame, including a first alloy wire preparing unit and a first alloy wire drawing unit;

the first alloy wire drawing unit includes a box, and a first step pulley, a second step pulley and a heating coil are arranged inside the box;

a first central axis of the first step pulley is parallel to a second central axis of the second step pulley; the first step pulley and the second step pulley are connected by a first alloy wire wound around the first step pulley and the second step pulley; and the heating coil is sleeved over the first alloy wire between the first step pulley and the second step pulley.

The preparing system of the copper-phosphorus brazing wire according to the present disclosure includes the first alloy wire preparing unit and the first alloy wire drawing unit; the first alloy wire preparing unit is configured to prepare the first alloy wire and includes a smelting device, a casting device and an extruding device; the above-mentioned devices are all conventional devices in the prior art. The first alloy wire is obtained through cooperation of all the devices; the first alloy wire is then drawn by the first alloy wire drawing unit, the first alloy wire drawing unit includes the box, the first step pulley, the second step pulley and the heating coil are arranged inside the box, the first alloy wire is subjected to electromagnetic induction heating treatment by the heating coil, and the heated first alloy wire is subjected to a tension under a difference of rotating speeds of the first step pulley and the second step pulley, then is subjected to constant-ratio creep deformation, and then is deformed to be thinned, so as to obtain the thin copper-phosphorus brazing wire.

In an embodiment, the first step pulley and the second step pulley are respectively arranged on a bottom surface of the box in a length direction of the box; the first central axis and the second central axis are respectively perpendicular to the bottom surface of the box.

In an embodiment, in the length direction of the box, a wire inlet is provided in a first side surface of the box, and a wire outlet is provided in a second side surface of the box; the wire inlet is close to the first step pulley, and the wire outlet is close to the second step pulley.

In an embodiment, the preparing system further includes a pay-off device and a take-up device; and the pay-off device and the take-up device are respectively arranged outside the box.

The pay-off device is close to the wire inlet. The take-up device is close to the wire outlet. The first alloy wire provided by the pay-off device enters the box through the wire inlet. The copper-phosphorus brazing wire exits from the wire outlet and is connected with the take-up device to be wound up.

In an embodiment, the wire outlet is provided with a shaping device. For example, the shaping device may be a shaping die.

In an embodiment, the first alloy wire between the first step pulley and the second step pulley is provided coaxially with the heating coil.

In an embodiment, a protective layer is provided outside the heating coil. The first alloy wire may quickly reach a required heating temperature by using the protective layer, and heat gathering is guaranteed.

In an embodiment, the first step pulley is connected with a first motor, and the second step pulley is connected with a second motor. In an embodiment, the first motor and the second motor are respectively arranged outside the box. The rotating speed of the first step pulley is controlled by the first motor, and the rotating speed of the second step pulley is controlled by the second motor.

Further descriptions are given below with reference to specific examples, comparative examples and drawings.

Example 1

A copper-phosphorus brazing wire for brazing a copper alloy spectacle frame included components with following mass percentage, 90.91% of Cu, 1.6% of Ag, 6.42% of P and 1.07% of Si and Al in total, wherein the Si and the Al had a mass ratio of 4:1.

The following preparing system was adopted in a preparing method of the copper-phosphorus brazing wire for brazing a copper alloy spectacle frame in the example, and the preparing system included a first alloy wire preparing unit and a first alloy wire drawing unit (see FIG. 1); the first alloy wire drawing unit included a box 4, a pay-off device 8 and a take-up device 9, and a first step pulley 2, a second step pulley 6 and a heating coil 5 were arranged inside the box 4; the first step pulley 2 and the second step pulley 6 were connected by a first alloy wire 1 wound around the first step pulley and the second step pulley; the heating coil 5 was sleeved over the first alloy wire 1 between the first step pulley 2 and the second step pulley 6;

the first step pulley 2 and the second step pulley 6 were respectively arranged on a bottom surface of the box 4 in a length direction of the box 4, and a first central axis 201 and a second central axis 601 were respectively perpendicular to the bottom surface of the box 4; in the length direction of the box 4, a wire inlet 401 was provided in a first side surface of the box 4, and a wire outlet 402 was provided in a second side surface of the box 4; the wire inlet 401 was close to the first step pulley 2, and the wire outlet 402 was close to the second step pulley 6; the wire outlet was provided with a shaping device 7;

the pay-off device 8 and the take-up device 9 were respectively arranged outside the box 4; and the first alloy wire 1 between the first step pulley 2 and the second step pulley 6 was provided coaxially with the heating coil 5; a protective layer 3 was provided outside the heating coil 5; the first step pulley 2 was connected with a first motor 10, and the second step pulley 6 was connected with a second motor 11.

The preparing method of the copper-phosphorus brazing wire specifically included the following steps:

(1) preparing the first alloy wire 1 using the first alloy wire preparing unit: weighing raw materials corresponding to the Cu, the Ag, the P, the Si and the Al respectively according to the mass percentages of the components of the brazing wire, and performing smelting, casting and hot extrusion on a mixture of the raw materials of the components to obtain the first alloy wire 1 with a diameter of 2.0 mm;

(2) preparing the copper-phosphorus brazing wire by the first alloy wire drawing unit: providing the first alloy wire 1 by the pay-off device 8, fixing one end of the first alloy wire 1 to the pay-off device 8, and allowing the other end of the first alloy wire to enter the box 4 from the wire inlet 401, and be sequentially wound around the first step pulley 2 (3 circles) and the second step pulley 6 (3 circles), and then exit from the wire outlet 402 to be connected with the take-up device 9; and (3) starting a power source to allow the heating coil 5 to heat the first alloy wire 1 passing through the heating coil, wherein a heating temperature was 370° C.; and starting the step pulleys, wherein a ratio of rotating speeds of the first step pulley 2 and the second step pulley 6 was 1:2, a difference of the rotating speeds of the first step pulley 2 and the second step pulley 6 applied an acting force to the heated alloy wire, the alloy wire was instantly tensioned after stressed, and underwent constant-ratio creep deformation and thinning to obtain a copper-phosphorus brazing wire with a diameter of 0.5 mm, and the copper-phosphorus brazing wire was wound up on the take-up device 9 after shaped by the shaping device 7.

Example 2

A copper-phosphorus brazing wire for brazing a copper alloy spectacle frame included components with following mass percentage, 89.96% of Cu, 1.67% of Ag, 6.8% of P and 1.57% of Si and Al in total, and the Si and the Al had a mass ratio of 4:1.

In a preparing method of the copper-phosphorus brazing wire in the example, except that a ratio of rotating speeds of the first step pulley and the second step pulley was 1:3, and the obtained copper-phosphorus brazing wire had a diameter of 0.3 mm, other conditions were the same as those in Example 1.

Example 3

A copper-phosphorus brazing wire for brazing a copper alloy spectacle frame included components with following mass percentage, 88.77% of Cu, 2.04% of Ag, 7.14% of P and 2.05% of Si and Al in total, and the Si and the Al had a mass ratio of 4:1.

In a preparing method of the copper-phosphorus brazing wire in the example, except that a ratio of rotating speeds of the first step pulley and the second step pulley was 1:4, and the obtained copper-phosphorus brazing wire had a diameter of 0.1 mm, other conditions were the same as those in Example 1.

Example 4

A copper-phosphorus brazing wire for brazing a copper alloy spectacle frame included components with following mass percentage, 89.16% of Cu, 2.23% of Ag, 7.6% of P and 1.01% of Si and Al in total, and the Si and the Al had a mass ratio of 4:1.

In a preparing method of the copper-phosphorus brazing wire in the example, except that a ratio of rotating speeds of the first step pulley and the second step pulley was 1:2, and the obtained copper-phosphorus brazing wire had a diameter of 0.5 mm, other conditions were the same as those in Example 1.

Example 5

A copper-phosphorus brazing wire for brazing a copper alloy spectacle frame included components with following mass percentage, 87.8% of Cu, 2.44% of Ag, 7.8% of P and 1.96% of Si and Al in total, and the Si and the Al had a mass ratio of 4:1.

In a preparing method of the copper-phosphorus brazing wire in the example, except that a ratio of rotating speeds of the first step pulley and the second step pulley was 1:3, and the obtained copper-phosphorus brazing wire had a diameter of 0.3 mm, other conditions were the same as those in Example 1.

Comparative Example 1

L209 copper-phosphorus brazing filler metal in the prior art was used.

Comparative Example 2

A copper-phosphorus brazing wire was prepared by the same condition as Example 1 except that Si and Al had a mass ratio of 5:1.

Comparative Example 3

A copper-phosphorus brazing wire was prepared by the same condition as Example 1 except that Si and Al had a mass ratio of 3:1.

Comparative Example 4

A copper-phosphorus brazing wire included components with following mass percentage,
92.8% of Cu, 3% of Ag, 4% of P, 0.1% of Al and 0.7% of Si; and
the preparing method was the same as that in Example 1.

Comparative Example 5

A preparing method of a copper-phosphorus fine wire included: performing hot extrusion and conventional hot drawing on a same raw material mixture as examples, wherein the resistance heating was adopted in hot drawing.

Experimental Example 1

1. Brazing Effect

An induction brazing test of nose pads of a spectacle frame was performed respectively using the copper-phosphorus brazing wires of Examples 1 to 5 and the brazing filler metal of Comparative Examples 1 to 4. On the premise of ensuring that condition of samples was the same as much as possible, 10 joints were brazed in each group, a seam filling effect of the joints was observed, appearances of brazing seams of the joints were compared, strength of the joints was measured on a universal tensile testing machine, and reference was made to the standard GB/T 11363.

Figure 2:
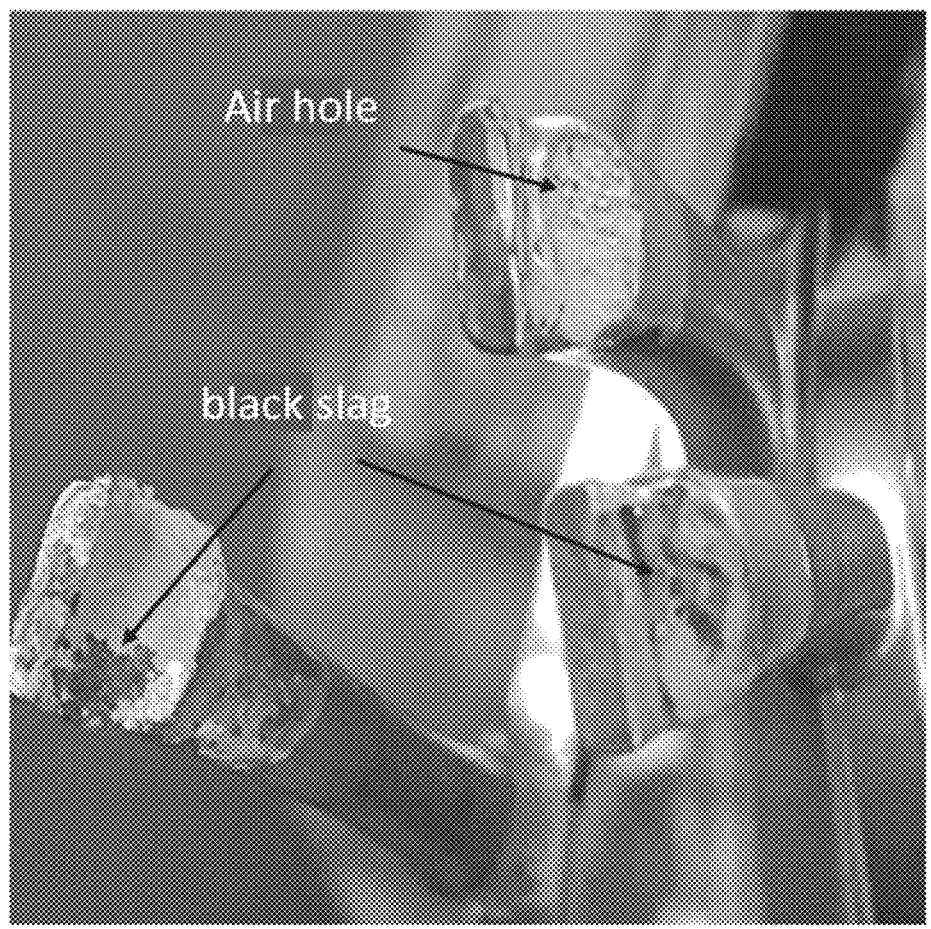
FIG. 2 is a view of an appearance of a brazed surface brazed by brazing filler metal of Comparative Example 1.
Figure 3:
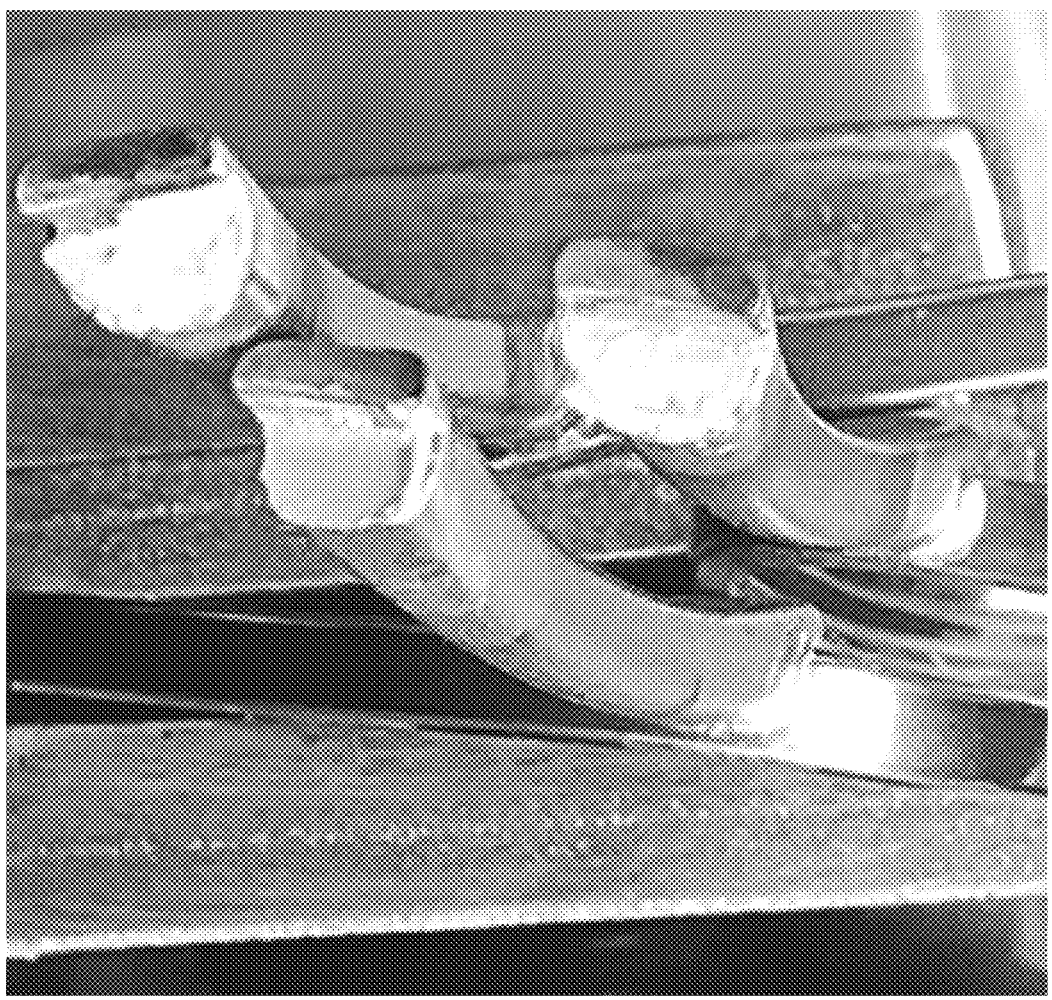
FIG. 3 is a view of an appearance of a brazed surface brazed by a copper-phosphorus brazing wire of Example 5.

FIG. 2 is a view of an appearance of a brazed surface brazed by the brazing filler metal of Comparative Example 1, and it can be seen that the brazed surface has a large number of air holes and black oxidized slag inclusions. FIG. 3 is a view of an appearance of a brazed surface brazed by the copper-phosphorus brazing wire in Example 5 of the present disclosure, and it can be seen that the brazed surface is cleaner and has no visible air holes and slag inclusions.

The strength of the brazing joints of the copper-phosphorus brazing wires of the examples and comparative examples is shown in table 1.

TABLE 1

| | Strength of Brazing Joint | |
|---|---|---|
| Group | Average tensile strength of joint/MPa | Quality of brazing seam of joint |
| Example 1 | 223 | No air hole and no slag inclusion |
| Example 2 | 230 | No air hole and little slag |
| Example 3 | 245 | No air hole and no slag inclusion |
| Example 4 | 250 | No air hole and no slag inclusion |
| Example 5 | 258 | No air hole and no slag inclusion |
| Comparative | 176 | Air holes and black oxidized |

TABLE 1-continued

Strength of Brazing Joint

| Group | Average tensile strength of joint/MPa | Quality of brazing seam of joint |
|---|---|---|
| Example 1 | | slag inclusions exist in a brazing seam |
| Comparative Example 2 | 198.2 | Air holes and black oxidized slag inclusions exist in a brazing seam |
| Comparative Example 3 | 186.5 | Air holes and black oxidized slag inclusions exist in a brazing seam |
| Comparative Example 4 | 175.5 | Air holes and black oxidized slag inclusions exist in a brazing seam |

From table 1, it can be seen that compared with the copper-phosphorus brazing filler metal in Comparative Example 1, the brazing joints of the copper-phosphorus brazing wires in the examples have higher strength, the brazed surfaces have fewer air hole, slag inclusion and other defects, and brazing quality is superior. This is because the copper-phosphorus brazing wires in the examples contain elements, such as Si, Al, or the like, and an appropriate composition ratio is adopted, such that Si and Al are easily oxidized to form a film, and thus a dense oxide film can be formed on a surface of molten metal, so as to prevent volatilization of Zn in the brazing seam base material and suppress formation of defects in the brazing seam, thereby improving the strength of the joint.

2. Yield

Yields of Examples 1 to 5 and Comparative Example 5 are shown in table 2.

TABLE 2

Yield

| Group | Yield (%) |
|---|---|
| Example 1 | 96.8 |
| Example 2 | 95 |
| Example 3 | 94.2 |
| Example 4 | 92 |
| Example 5 | 90.5 |
| Comparative Example 5 | 50 |

A heating method adopted by the present disclosure is electromagnetic induction heating, the heat generation efficiency is higher, such that the first alloy wire is heated to 350~400° C. quickly. The tension is applied to the first alloy wire by the difference of the rotating speeds of the first step pulley and the second step pulley, such that the first alloy wire is subjected to creep deformation, deformation and thinning, and then a finished wire is obtained by using a shaping die. The preparing method belongs to die-free drawing, avoids frictional resistance between the wire and a die hole, reduces energy consumption and brittle fractures of the wire, thus can improve the processing yield of the copper-phosphorus fine wire with a diameter below 0.5 mm, which has a yield more than 90% from extrusion of the thick wire.

In Comparative Example 5, resistance heating is adopted in hot drawing, in which the heat is generated by resistance of metal itself, and the heat generation efficiency is low, such that the copper-phosphorus wire is often heated insufficiently, brittle fractures are severe in the conventional drawing process of penetration through a wire-drawing die, and the yield is low and is about 50% from extrusion of the wire.

Finally, it should be noted that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial or all technical features therein; and these modifications or substitutions do not make essence of corresponding technical solutions depart from the scope of technical solutions of embodiments of the present disclosure.

What is claimed is:

1. A copper-phosphorus brazing wire for brazing a copper alloy spectacle frame, comprising components with following mass percentage, 87.1% to 91.4% of Cu, 1.5% to 2.6% of Ag, 5.9% to 8.4% of P, 0.2% to 0.42% of Al and 0.8% to 1.68% of Si, wherein the Si and the Al having a mass ratio of 4:1.

2. The copper-phosphorus brazing wire for brazing a copper alloy spectacle frame according to claim 1, comprising components with following mass percentage, 87.5% to 89.4% of Cu, 2.1% to 2.5% of Ag, 7.5% to 8% of P, 0.2% to 0.4% of Al and 0.8% to 1.6% of Si.

3. A preparing method of the copper-phosphorus brazing wire for brazing a copper alloy spectacle frame according to claim 1, comprising following steps:

according to mass percentages of components in the copper-phosphorus brazing wire for brazing a copper alloy spectacle frame, taking a mixture of raw materials corresponding to the components, and performing smelting, casting and extruding to obtain a first alloy wire; and sequentially winding the first alloy wire around a first step pulley for several circles and a second step pulley for several circles, continuously performing electromagnetic induction heating treatment on the first alloy wire between the first step pulley and the second step pulley, and rotating the first step pulley and the second step pulley in a same direction at different rotating speeds, such that the first alloy wire wound around the first step pulley is deformed and then transferred to be wound around the second step pulley, so as to obtain the copper-phosphorus brazing wire, wherein the copper-phosphorus brazing wire for brazing a copper alloy spectacle frame comprises components with following mass percentage, 87.1% to 91.4% of Cu, 1.5% to 2.6% of Ag, 5.9% to 8.4% of P, 0.2% to 0.42% of Al, and 0.8% to 1.68% of Si, and wherein the Si and the Al having a mass ratio of 4:1.

4. The preparing method of the copper-phosphorus brazing wire for brazing a copper alloy spectacle frame according to claim 3, wherein a temperature of the electromagnetic induction heating treatment is 350 to 400° C.

5. The preparing method of the copper-phosphorus brazing wire for brazing a copper alloy spectacle frame according to claim 3, comprising at least one of following features (1) to (4):

(1) the first alloy wire on the first step pulley is connected with a first alloy wire supply source;

(2) the copper-phosphorus brazing wire is subjected to a shaping treatment;

(3) the copper-phosphorus brazing wire after the shaping treatment is wound up;

(4) in the step of sequentially winding the first alloy wire around a first step pulley for several circles and a second step pulley for several circles, numbers of circles of the first alloy wire wound around the first step pulley and the second step pulley are 2 to 3 respectively.

6. The preparing method of the copper-phosphorus brazing wire for brazing a copper alloy spectacle frame according to claim 3, wherein a ratio of the rotating speeds of the first step pulley and the second step pulley is 1:(2 to 4).

7. The preparing method of the copper-phosphorus brazing wire for brazing a copper alloy spectacle frame according to claim 3, comprising at least one of following features (1) to (2):
   (1) the first alloy wire has a diameter of 1.8 to 2.0 mm;
   (2) the copper-phosphorus brazing wire has a diameter less than 0.5 mm.

8. The preparing method according to claim 3, wherein the copper-phosphorus brazing wire for brazing a copper alloy spectacle frame comprises components with following mass percentage, 87.5% to 89.4% of Cu, 2.1% to 2.5% of Ag, 7.5% to 8% of P, 0.2% to 0.4% of Al and 0.8% to 1.6% of Si.

\* \* \* \* \*